Dec. 7, 1971  J. W. SINDEN ET AL  3,624,990
MACHINE FOR HARVESTING MUSHROOMS
Filed Oct. 15, 1970  2 Sheets-Sheet 2
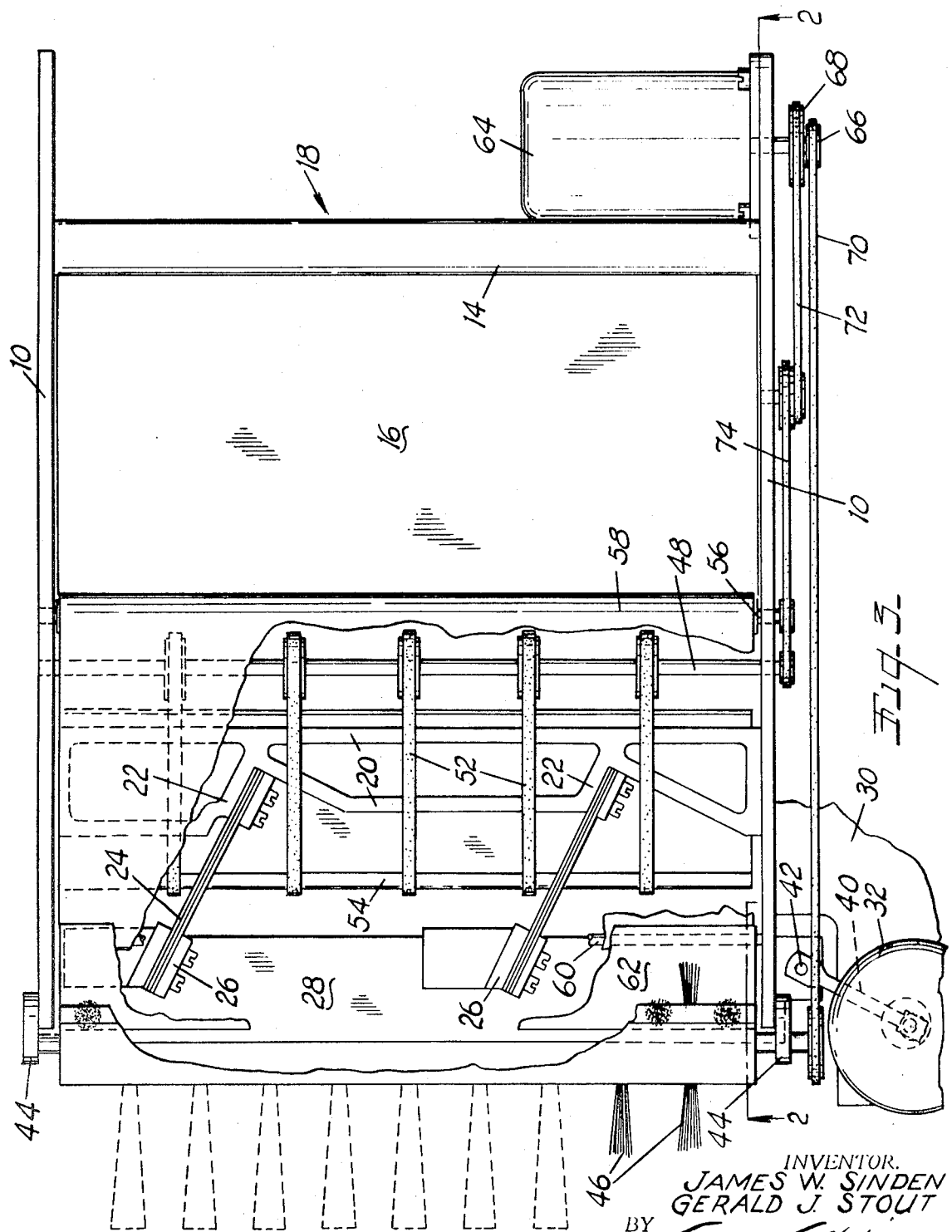
INVENTOR.
JAMES W. SINDEN
GERALD J. STOUT
BY
Austin A. Webb
ATTORNEY

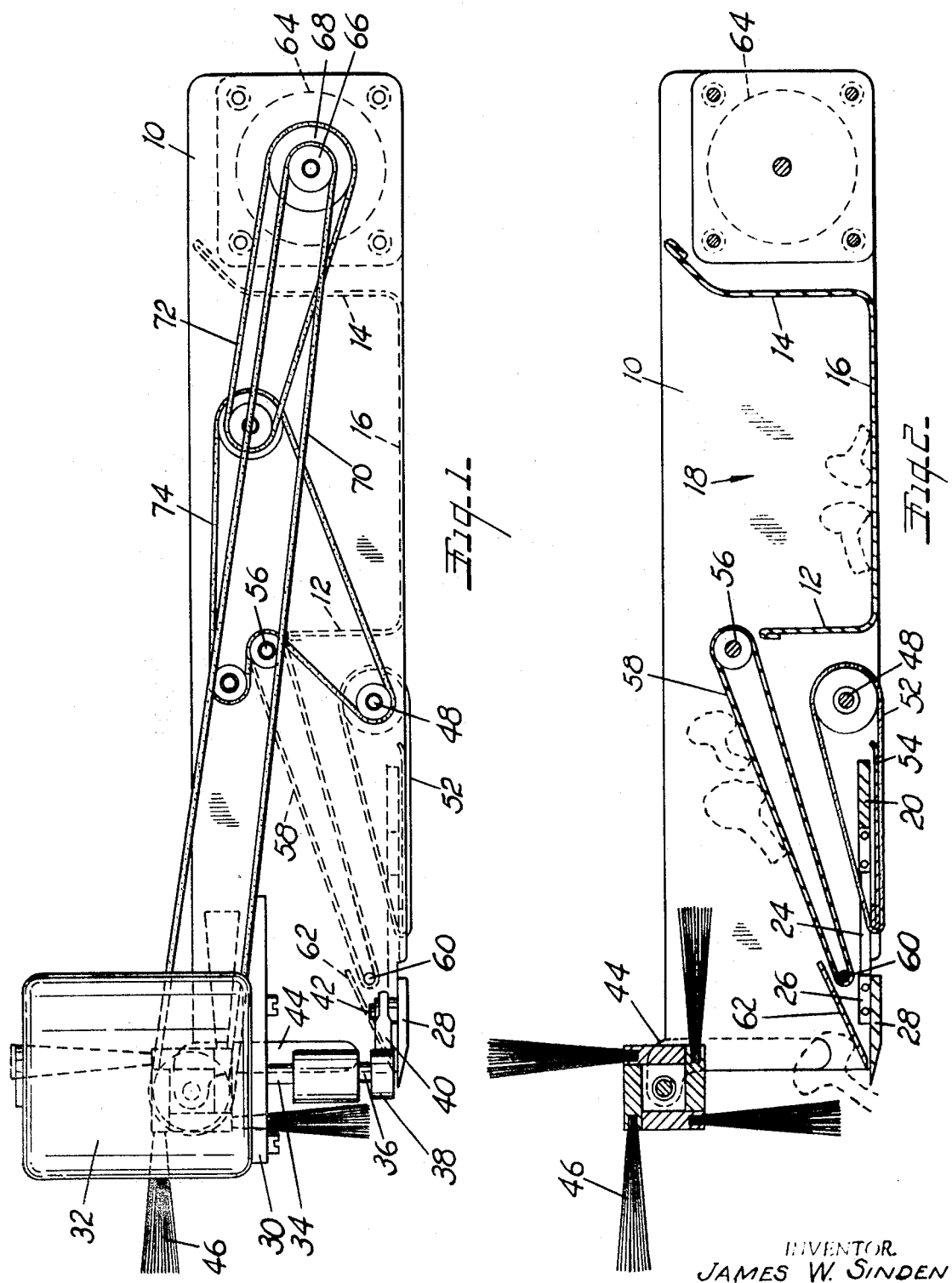

United States Patent Office 3,624,990
Patented Dec. 7, 1971

3,624,990
MACHINE FOR HARVESTING MUSHROOMS
James W. Sinden, Zurich, Switzerland, and Gerald J. Stout, State College, Pa., assignors to Blueberry Equipment, Inc., South Haven, Mich.
Filed Oct. 15, 1970, Ser. No. 81,066
Int. Cl. A01d 45/00
U.S. Cl. 56—327 R
7 Claims

ABSTRACT OF THE DISCLOSURE

A rectangular frame is supported from the growing bed by crawler belts arranged in transversely spaced, longitudinally extending loops. A cutter bar is supported in front of the belts by transversely angled, horizontal, spring arms. A first motor with eccentric drive rapidly oscillates the cutter along its length. A rotating cylindrical brush located over the cutter bar brushes the crop against and rearwardly over the cutter. A collector belt inclined rearwardly and upwardly receives the cut crop and delivers it over the top of a receptable located within the rear end of the frame. A second motor drives the crawler belts, the brush and the collector belt.

DESCRIPTION

The drawings of which there are two sheets illustrate a preferred form of the harvester.

FIG. 1 is a side elevational view of the machine.
FIG. 2 is a cross sectional view taken along the line 2—2 in FIG. 3.
FIG. 3 is a plan view with parts broken away to show underlying parts.

BACKGROUND OF THE INVENTION

As is well known, mushrooms are grown commercially in darkened enclosures where conditions of temperature and humidity are conducive to growth. The conditions may be naturally induced as in caves or mines; or they may be artificially created in buildings developed for the purpose. In either case, the mushrooms are cultivated in beds of earth that have relatively uneven surfaces, Mushrooms are relatively fragile and susceptible to crushing. They must be cut along or across their stems, as distinguished from being broken or pulled. In the past, this has been done by hand.

The present invention provides a motor driven frame or carriage that advances a vibrating or rapidly oscillating knife against the stems of mushrooms across the swath of the machine, while a superimposed brush rotates with the forward movement of the carriage to engage the heads or top of the mushrooms and hold their stems against the pressure of the blade. The brush also clears or transfers cut mushrooms to a collecting belt which moves them to a collecting bin or receptacle.

The frame of the machine consists of longitudinally extending, upright side members or rails 10 which are connected along their rear portions by the front wall 12, rear wall 14 and bottom wall 16 of a collecting receptacle generally indicated at 18. Forwardly of the receptacle, the side rails are connected by a horizontal cross member 20 located adjacent the lower edges of the rails. The cross member 20 is of open construction with laterally inclined ribs 22 forming mounting bases for anchors for leaf springs 24. The springs extend forwardly at an angle and are connected to mounting blocks 26 secured to the rear edge of a knife or cutter bar 28. The cutter bar projects under the rails particularly at its left end.

A bracket 30 secured to the front of the left side rail 10 supports a motor 32 with an upright shaft 34. The shaft has an eccentric lower end 36 that is received in a bearing 38 carried by a short connecting rod 40. The rod in turn has a drive pin 42 engaged with the end of the cutter bar. The motor 32 rotates at high speed (3500–4000 r.p.m.) to oscillate the knife along its cutting edge. The angularly disposed springs 24 permit this action, and determine that the knife vibrates rearwardly as well as transversely relative to the direction of advance of the carriage.

The forward ends of the side rails carry upstanding brackets 44 which act as bearings to support a transverse sweeper brush 46 that rotates with its lower edge moving rearwardly over the knife. The brush yieldably presses the heads of the mushrooms rearwardly over the cutting edge of the knife.

Just forwardly of the front wall 12 of the collecting receptacle, a shaft 48 extends across the frame and supports spaced drive belts 52 which are looped forwardly around the folded front edge of a support shoe 54. Located just over the front edge of the receptacle is a second shaft 56 which acts as a drive roll for the collecting belt 58. The belt extends all the way across the frame, and its front end inclines downwardly and around a small diameter idler roller or pin 60. A narrow apron strip 62 overlaps the front end of the collector belt and extends forwardly to just over the cutter bar, thus shielding the support springs 24 from contact with the crop.

A second motor 64 mounted between the side rails behind the receptacle 18 drives two pulleys 66 and 68 through the outer side of the left side rail. The pulley 66 drives the brush through belt 70, while pulley 68 drives the crawler belts 52 and the collector belt 58, through belts 72 and 74.

In actual practice, mushrooms are grown in beds four by eight feet in size and the machine is four feet long to cut a bed at a single pass. The machine moves on the belts 52 at a speed of about eight feet per minute to harvest one bed per minute. The knife oscillates at about 3000 cycles per minute which results in a rapid orbital cutting motion as the machine advances across the bed. The brush 46 rotates rearwardly slightly faster than the advancing speed of the machine and knife.

What is claimed as new is:
1. A machine for harvesting mushrooms from growing beds comprising,
   a supporting frame having a longitudinally extending side member,
   a transversely extending cross member connected to said side member and adapted to overlie the growing bed,
   a cutter bar having a sharpened leading edge disposed in front of said cross member,
   a pair of leaf springs having their rear ends connected to said cross member and extending forwardly to connections to said cutter bar to support the latter,
   a first motor supported on said side member and having an oscillating drive connection to said cutter bar,
   a brush rotatably mounted on said frame with its lower periphery located to swing over said cutter bar,
   a collector belt extending along the rear edge of said cutter bar to receive the crop swept back by said brush,
   a receptacle carried by said frame and positioned to receive the crop from said belt,
   and a second motor carried by said frame and connected to drive said brush and said belt.
2. A harvesting machine as defined in claim 1 in which there are drive means on said carriage engageable with said growing bed and connected to said second motor to advance said frame along the growing bed.
3. A harvesting machine as defined in claim 2 in which said belt is looped longitudinally of the machine and inclines upwardly from behind said cutter bar to over the top of said receptacle, said receptacle being carried by said frame over the cutting swath of the machine.

4. A harvesting machine as defined in claim 3 in which there is a plate extending from between said cutter bar and said brush to over the leading edge of said belt.

5. A harvesting machine as defined in claim 2 in which said frame has spaced parallel side members supporting the opposite ends of said brush and said cross member,
   drive means including a plurality of crawler belt loops spaced transversely of said frame and disposed behind said cutter bar and under said collector belt and between said springs and said side members.

6. A harvesting machine as defined in claim 5 in which there is a flat support shoe extending between said side members and through said crawler belt loops to support said frame from the lower reaches of the crawler belt loops.

7. A harvesting machine as defined in claim 1 in which said leaf springs extend obliquely forwardly from said cross member,
   said first motor being mounted on said side member with its shaft in vertical position,
   the oscillating drive connection consisting of a connecting rod pinned to said cutter bar and extending generally formal to said leaf springs to an eccentric on the end of the motor shaft.

References Cited

UNITED STATES PATENTS

| | | | |
|---|---|---|---|
| 2,639,573 | 5/1953 | McLaughlin | 56—328 R |
| 3,353,342 | 11/1967 | Hill et al. | 56—327 R |

LOUIS G. MANCENE, Primary Examiner

J. N. ESKOVITZ, Assistant Examiner

U.S. Cl. X.R.

56—306, 327 A